(12) United States Patent
Lambourne et al.

(10) Patent No.: US 11,279,100 B2
(45) Date of Patent: Mar. 22, 2022

(54) POLYMER MATRIX COMPOSITE REPAIR (71) Applicant: Rolls-Royce plc, London (GB)

(72) Inventors: Alexis Lambourne, Belper (GB); Alexander C. Smith, Manchester (GB); Jameel B. Khan, Manchester (GB)

(73) Assignee: Rolls-Royce plc, London (GB)

( * ) Notice: Subject to any disclaimer, the term of this patent is extended or adjusted under 35 U.S.C. 154(b) by 470 days.

(21) Appl. No.: 16/387,107

(22) Filed: Apr. 17, 2019

(65) Prior Publication Data

US 2019/0337246 A1 Nov. 7, 2019

(30) Foreign Application Priority Data

May 1, 2018 (GB) ...................................... 1807144

(51) Int. Cl.
*B29C 73/10* (2006.01)
*B29C 35/02* (2006.01)
(Continued)

(52) U.S. Cl.
CPC .......... *B29C 73/10* (2013.01); *B29C 35/0288* (2013.01); *B29C 35/0805* (2013.01); *B29C 73/32* (2013.01); *C08J 5/042* (2013.01); *B29C 2035/0816* (2013.01); *B29C 2037/903* (2013.01); *B29C 2791/006* (2013.01)

(58) Field of Classification Search
CPC . B29C 73/10; B29C 35/0288; B29C 35/0805; B29C 73/32; C08J 5/042
See application file for complete search history.

(56) References Cited

U.S. PATENT DOCUMENTS 5,240,542 A 8/1993 Miller et al.
5,248,864 A 9/1993 Kodokian
(Continued)

FOREIGN PATENT DOCUMENTS

EP 0 281 347 A2 9/1988
EP 2796265 10/2014
(Continued)

OTHER PUBLICATIONS https://www.sciencedirect.com/science/article/pii/S1359835X18303622, Elsevier, "composites Part A: Applied Sicence and Manufacturing"; vol. 115, pp. 88-103 (Year: 2018).*
(Continued)

*Primary Examiner* — Jeffry H Aftergut
*Assistant Examiner* — Jaeyun Lee
(74) *Attorney, Agent, or Firm* — Simpson & Simpson, PLLC (57) ABSTRACT

A procedure for repairing a polymer matrix composite component is provided. The procedure includes the steps of: providing a polymer matrix composite component having a site prepared for repair by removal of damaged or defective material; locating an uncured, polymer matrix composite repair patch at the site to re-build the component thereat; and curing the polymer matrix of the repair patch by heating the patch using eddy currents induced by one or more alternating current coils. The repair patch is without metallic additives, such that the repaired polymer matrix composite after the curing step is also without metallic additives in the vicinity of the repair patch.

13 Claims, 8 Drawing Sheets (51) Int. Cl.
  *B29C 35/08*   (2006.01)
  *B29C 73/32*   (2006.01)
  *C08J 5/04*    (2006.01)
  *B29C 37/00*   (2006.01)

(56) References Cited

U.S. PATENT DOCUMENTS

| | | |
|---|---|---|
| 5,483,043 A | 1/1996 | Sturman, Jr. et al. |
| 5,833,795 A | 11/1998 | Smith et al. |
| 6,056,844 A | 5/2000 | Guiles et al. |
| 2015/0328847 A1 | 11/2015 | Kia et al. |

FOREIGN PATENT DOCUMENTS

| | | |
|---|---|---|
| EP | 3184288 | 6/2017 |
| WO | WO 90/08027 | 7/1990 |
| WO | WO 98/00274 | 1/1998 |
| WO | WO 2013/110270 | 8/2013 |

OTHER PUBLICATIONS

Extended Search Report dated Sep. 19, 2019 in connection with European Patent Appl. No. 19166448, applicant Rolls-Royce plc (11 pages).

Fink, et al., Non-Polluting Composites Repair and Remanufacturing for Military Applications: An Environmental and Cost-Savings Analysis, Army Research Laboratory, dated Dec. 1999, 103 pages.

Search Report Under Section 17 issued in connection with GB1807144.9 dated Oct. 22, 2018, 1 page.

\* cited by examiner

| $NI_0$ (amps) | $T_0$ (degrees Celsius) |
|---|---|
| 600 | 59.4 |
| 848 | 93.87 |
| 1040 | 128.3 |
| 1200 | 162.8 |
| 1340 | 197.3 |
| 1468 | 231.7 |
| 1584 | 266.16 |

*FIG. 10*

POLYMER MATRIX COMPOSITE REPAIR

CROSS-REFERENCE TO RELATED APPLICATIONS

This application is based upon and claims the benefit of priority from UK Patent Application No. 1807144.9, filed May 1, 2018, the entire contents of which are incorporated herein by reference.

TECHNICAL FIELD

This disclosure relates to repair of polymer matrix composites.

BACKGROUND

Carbon fibre composites (CFCs) are used extensively in aerospace applications. However, components formed from CFCs can suffer from defects or damage, such as: matrix cracks, delamination between adjacent plies, fibre breakage and impact damage.

When a defect or damage is detected (e.g. a matrix crack detected by non-destructive evaluation (NDE)), one option may be to repair the component. In a typical repair process, the damage is mechanically ground out, after which a "wet lay-up" or prepreg patch is applied to the ground out region to re-build the component. The patch comprises an uncured thermosetting resin infused into an array of carbon fibres, which may be provided as a complex lay-up of multi layers whose thickness and orientation are defined by the application. To cure the patch, both heat and pressure may be required, the heat inducing cross-linking of the resin and the pressure eliminating voids and promotes adhesion to the parent structure. In a typical cure cycle, maximum temperatures of between 120 and 180 degrees Celsius may be reached. The curing temperature is determined based on the resin used in the composite patch, which ideally is the same resin used in the parent structure to be repaired.

There are different conventional approaches for achieving the curing temperature and pressure can be achieved.

One approach is to apply a one-sided thermal blanket and a vacuum bag over the patch during curing. Vacuum bagging is an established and generally effective way of applying the pressure. However, the thermal blanket is generally is less effective as much heat is lost to the environment and carbon fibre composites are poor thermal conductors, particularly in the through-thickness direction of the fibre layers. In addition, the poor inter-lamina thermal conductivity makes controlled curing of all points through the thickness of the patch difficult as the temperature at the outer surface of the patch, adjacent to the blanket, may be much greater than the temperature at its inner surface at the bottom of the ground out region.

An alternative approach is to cure the patch in an autoclave. This provides controlled temperature and pressure conditions, but is generally incompatible with in situ component repair. Thus typically the damaged component must be disassembled and transported to the autoclave for repair. This may not be feasible with complex engineering structures where a damaged component may be integrated into a larger structure which would also then require disassembly (e.g. a composite wing box). Further, in many instances, even if autoclaving for repair is possible, it may not be desirable as the parent structure also undergoes the thermal curing cycle, which may undermine its own mechanical properties.

A third approach is to induction heat the patch using an alternating current (AC) coil that is placed in close proximity to the patch. The coil induces a changing magnetic flux density in the patch, which in turn induces an eddy current perpendicular to the direction of the magnetic field in accordance with Faraday's Law. The eddy current circulating through electrically conducting components of the patch raises the temperature by Joule heating. Thus Fink, B. K. (1999), *Non-Polluting Composites Repair and Remanufacturing for Military Applications: Induction-Based Repair of Integral Armor*, Army Research Laboratory describes induction heating of CFCs for repair by incorporating electrically conductive copper mesh between plies of CFC layers within the repair patch, pressure being applied by a vacuum bag. The AC frequency range was 100 to 600 kilohertz, generating a peak-to-peak current in the copper mesh of from 0 to 55 amps, which resulted in a sufficient temperature rise to induce cure. U.S. Pat. Nos. 5,248,864 and 6,056,844 propose similar techniques. Thus in U.S. Pat. No. 6,056,844 electrically conductive additives to the resin were used to couple with a magnetic field to induce heating. The conductive filler was a magnetic powder such that a combination of hysteresis and eddy current losses induced temperature rises in the patch.

Although this third approach avoids some of the problems associated with the use of thermal blankets and autoclaves, the use of electrical conductive additives such as copper mesh or magnetic particles changes the electrical, mechanical and thermal properties of the CFC. Particularly in aerospace applications, these electrically conductive additives can have some or all of the following detrimental effects:

degraded lightning strike protection as the path to ground may be adversely affected via the provision of an un-planned ground plane in the aircraft structure;

alteration of electromagnetic shielding behaviour; and/or undermining of the mechanical properties of the parent structure and weakening of the patch repair.

In addition a patch repair incorporating conductive additives would typically be a non-standard material requiring additional test and fight certification.

Hence, electrically conductive additives to CFC patches are undesirable and a hazard for aerospace applications.

SUMMARY

In an aspect, there is provided a procedure for repairing a polymer matrix composite component comprising:

providing a polymer matrix composite component having a site prepared for repair by removal of damaged or defective material;

locating an uncured, polymer matrix composite repair patch at the site to re-build the component thereat; and curing the polymer matrix of the repair patch by heating the patch using eddy currents induced by one or more alternating current coils, including a process of determining a desired maximum temperature of the patch and a desired penetration depth of the electromagnetic field produced by the one or more alternating current coils, and using said desired maximum temperature and said desired penetration depth to determine corresponding values of amp-turns and frequency which are then applied to the, or each, coil in the curing process.

More specifically, in a first aspect, the repair patch can be without metallic additives.

Thus the repaired polymer matrix composite after the curing step can also be without metallic additives in the vicinity of the repair patch, whereby the disadvantages noted above can be avoided.

The composite of the repair patch may have sufficient intrinsic electrical conductivity without such additives to allow all the eddy currents used to heat the patch to flow only through the composite.

The repair procedure may have any one or, to the extent that they are compatible, any combination of the following optional features.

The polymer matrix of the repair patch can be cured by heating the patch using eddy currents induced by one or more alternating current coils. For example, the eddy currents may induced by just one coil on one side of the patch, or by two coils on opposite sides of the patch.

Pressure may be applied to the repair patch during the curing, e.g. applied by vacuum bagging the patch.

Advantageously, the polymer matrix composite of the repair patch can be the same material as the polymer matrix composite of the component. For example, the repair patch can be substantially identical in terms of the material used to the material removed from the repair site (except that of course the patch can be without damage or defects). Thus the component and the patch can use the same polymer matrix and the same reinforcement in the same volume fractions, with the lay-up of the reinforcement in the patch continuing the lay-up of the reinforcement in the component.

The polymer matrix composite of the repair patch may be a carbon fibre reinforced polymer matrix composite.

The procedure may further include monitoring the patch temperature during the induction heating (e.g. using an infrared camera or embedded sensors such as thermocouples or fibre Bragg gratings) and adjusting amp-turns applied to the, or each, coil to attain a desired maximum temperature of the patch.

The procedure may further include a preliminary step of removing (e.g. by grinding out) the damaged or defective material from the component to prepare the site.

The procedure may further include using a look-up table to relate the desired maximum temperature and said desired penetration depth to corresponding values of amp-turns and frequency. By a look-up table we mean an actual table of values or an empirical equation relating maximum temperature and penetration depth to amp-turns and frequency.

The desired maximum temperature and said desired penetration depth may be related to corresponding values of amp-turns and frequency by:

(i) providing geometric properties of the patch, geometric properties of the coil, electrical properties of the patch, and thermal properties of the patch;

(ii) determining a desired maximum temperature of the patch and a desired penetration depth of the electromagnetic field of the alternating current coil;

(iii) estimating values for the amp-turns and frequency of the alternating current to be applied to a coil:

(iv) using the provided geometric properties of the patch and the coil, the provided electrical properties, and the estimated values for the amp-turns and frequency to predict an eddy current density distribution in the patch and a corresponding penetration depth of the electromagnetic field produced by the coil, (v) using the predicted eddy current density distribution, the provided geometric properties of the patch, and the provided thermal properties of the patch to predict the maximum temperature of the patch, and (vi) repeating steps (iii) to (v) for different estimated values for the amp-turns and frequency of the alternating current until the predicted penetration depth and the predicted maximum temperature converge on the desired maximum temperature of the patch and a desired penetration depth of the electromagnetic field.

More generally, in another aspect there is provided a method of determining values for amp-turns and frequency of an alternating current to be applied to an alternating current coil used for induction heating of a polymer matrix composite repair patch, the method comprising:

(i) providing geometric properties of the patch, geometric properties of the coil, electrical properties of the patch, and thermal properties of the patch;

(ii) determining a desired maximum temperature of the patch and a desired penetration depth of the electromagnetic field of the alternating current coil;

(iii) estimating values for the amp-turns and frequency of the alternating current to be applied to a coil:

(iv) using the provided geometric properties of the patch and the coil, the provided electrical properties, and the estimated values for the amp-turns and frequency to predict an eddy current density distribution in the patch and a corresponding penetration depth of the electromagnetic field produced by the coil, (v) using the predicted eddy current density distribution, the provided geometric properties of the patch, and the provided thermal properties of the patch to predict the maximum temperature of the patch, and (vi) repeating steps (iii) to (v) for different estimated values for the amp-turns and frequency of the alternating current until the predicted penetration depth and the predicted maximum temperature converge on the desired maximum temperature of the patch and a desired penetration depth of the electromagnetic field.

The estimated values for the amp-turns and frequency of the alternating current whose predicted penetration depth and the predicted maximum temperature match the desired maximum temperature of the patch and a desired penetration depth of the electromagnetic field may be stored in a look-up table as a key-value pair.

Steps (i) to (vi) may be repeated for one or more of: different geometric properties of the patch; different geometric properties of the coil; different electrical properties of the patch; different thermal properties of the patch.

In both the above-mentioned example of the repair procedure and the method, the geometric properties of the patch can include its shape, dimensions, lay-up arrangement (i.e. position and number of layers and fibre direction), and volume fraction of carbon fibres; the geometric properties of the coil can include its diameter, number of turns, and stand-off from the patch; the electrical properties of the patch can include electrical conductivities in longitudinal and transverse directions of the fibres and through-thickness directions of the layers, and temperature coefficients of the electrical conductivities; and the thermal properties of the patch can include thermal conductivities in longitudinal and transverse directions of the fibres and through-thickness directions of the layers, densities, heat capacities, and heat transfer coefficients.

In a further aspect, there is provided a computer-readable medium storing one or more look-up tables constructed by the method of the previous aspect, i.e. the, or each, look-up table comprising values for amp-turns and frequency of an alternating current to be applied to a coil used for induction heating of a polymer matrix composite repair patch, the look-up table relating desired maximum temperatures of the patch and desired penetration depths of the electromagnetic field produced by the coil to corresponding values for the amp-turns and frequency. The term "computer-readable medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

The computer-readable medium can thus be used by operators engaged in repair of polymer matrix composite components with suitable values for amp-turns and frequency to apply to an AC coil in order to perform the repair procedure of the present disclosure.

BRIEF DESCRIPTION OF THE DRAWINGS

Embodiments will now be described by way of example only with reference to the accompanying drawings, which are purely schematic and not to scale, and in which.

DETAILED DESCRIPTION

The following detailed description concerns composite materials that can be cured by eddy current heating. In particular, it concerns any polymer matrix composite having an intrinsic electrical conductivity which is sufficient to allow eddy currents to flow through it and thereby heat and cure it. A particularly useful form of composite having such a property, however, is carbon fibre-reinforced polymer matrix composite (CFC). The following detailed description therefore refers mainly to CFCs, but in principle the present disclosure applies more widely to other suitable composites.

A key to successful repair of CFCs is to understand their material properties and exploit them electromagnetically using specific current and frequency combinations.

Conventional approaches to repair of CFCs discussed above typically use a patch repair technique in which some form of electrically conductive additive is introduced into the patch. In the present case, however, there is provided an electromagnetic repair approach which does not require the use of such additives. The approach determines a combination of amp-turns and frequency to be used for the, or each, induction coil based a desired maximum temperature of the patch and a desired penetration depth of the electromagnetic field. This determination may be based on factors such as the dimensions of the CFC repair patch, the orientation of the CFC layers in the patch, the carbon fibre volume fraction, and the distance of the coil to the repair surface. This can eliminate a need for electrically conductive additives to be used in the repair patch. The repair patch can thus avoid affecting any lightning strike protection layout or electromagnetic shielding. It can also avoid undermining the mechanical properties of the parent structure due to over-temperatures and avoid use of non-standard materials with associated needs for additional testing and certification. Furthermore, the approach disclosed herein can reduce repair times and costs because it enables repairs to be carried out on-site and in situ, and with relatively simple equipment requirements.

Figure 1:
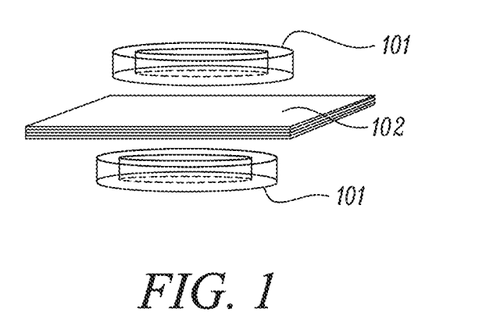
FIG. 1 shows double-sided coils for heating from opposite sides of a composite repair patch.
Figure 2:
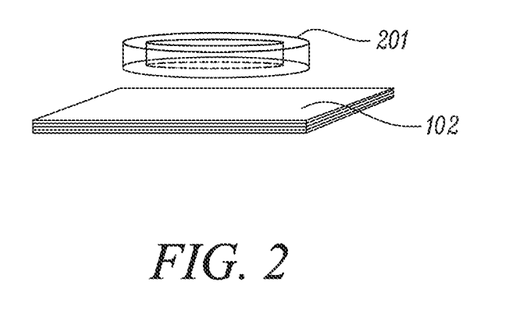
FIG. 2 shows a single-sided coil for heating from one side of a composite repair patch.

The electromagnetic heating system disclosed herein can have one or more induction coils to enable repairs having different areas, depths and shapes. For example, the system may have double-sided coils 101 as shown in FIG. 1 for heating from opposite sides of a patch 102, or may have a single-sided induction coil 201 as shown in FIG. 2 for heating from one side of the patch 102.

Figure 3:
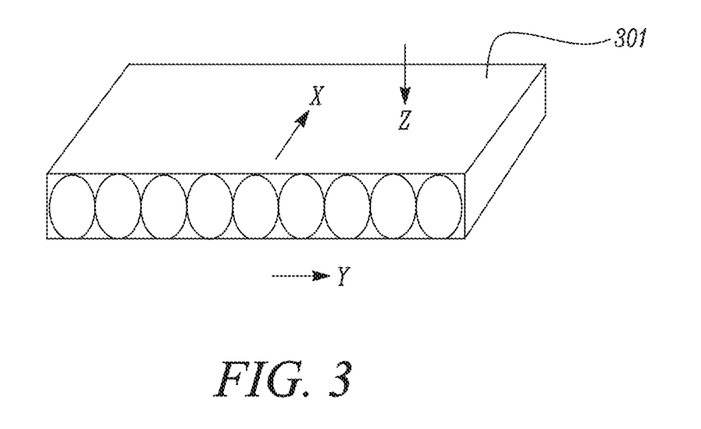
FIG. 3 shows schematically electrical conductivities in different directions of a carbon fibre reinforced polymer matrix composite layer.

The electrical conductivity of CFCs is anisotropic as illustrated in FIG. 3, which shows schematically a CFC layer 301 with the highest conductivity along the fibre direction x, and lower electrical conductivities in the transverse direction y and through-thickness direction z, respectively. For the purposes of illustration, the conductivity in the fibre direction may be typically 40000 siemens per metre, whilst in the transverse and through-thickness directions the conductivity may only be between 20 and 200 siemens per metre, and between 1 and 10 siemens per metre respectively.

This anisotropic electrical conductivity means that the skin effect (i.e. the penetration depth of electromagnetic fields into the CFC) is determined based on an orthogonal relationship between the direction of the magnetic field and the direction of the induced current in the composite. Thus considering orthogonal axes x, y, z, and a CFC whose carbon fibres extend in the x direction (see FIG. 3), the penetration depth $\delta_x$ measured along the fibre direction when the magnetic field is along the y (transverse) direction is given by:

$$\delta_x = \sqrt{\frac{2}{\omega \mu_y \sigma_z}} \quad \text{[Equation 1]}$$

where ω is the angular frequency given by 2πf, f being the frequency of the alternating current applied to the coil, $\mu_y$ is the magnetic permeability of the CFC in the y direction, and $\sigma_z$ is the electrical conductivity of the CFC in the z (through-thickness) direction.

However, the magnetic permeability in a CFC is effectively constant in all directions and can also be treated as having the same magnetic permeability as air ($\mu_0$). Thus:

$$\delta_x = \sqrt{\frac{2}{\omega \mu_0 \sigma_z}} \qquad \text{[Equation 2]}$$

Similarly, the penetration depth $\delta_z$ measured in the through-thickness direction z when the magnetic field is along the transverse y direction is given by:

$$\delta_z = \sqrt{\frac{2}{\omega \mu_0 \sigma_x}} \qquad \text{[Equation 3]}$$

where $\sigma_x$ is the electrical conductivity of the CFC in the x direction.

Unlike the magnetic permeability, the electrical conductivity and thus the penetration depth depends strongly of the orientation of the fibres. The skin effect can therefore be manipulated based on dimensions and the lay-up of the repair patch to ensure complete heating of the repair area. In particular, as the electrical conductivity of the carbon fibres, and the CFC more generally, cannot be altered if conductive additives are not incorporated in the repair patch, the parameter which effectively controls the skin effect is the supply frequency to the coil.

As set out above, the repair procedure disclosed herein includes a process of determining the coil amp-turns NI and frequency f combination required to achieve the appropriate curing temperature of the CFC resin matrix through the thickness of the repair patch. The process flow of the procedure is shown schematically in FIG. 4.

Figure 4:
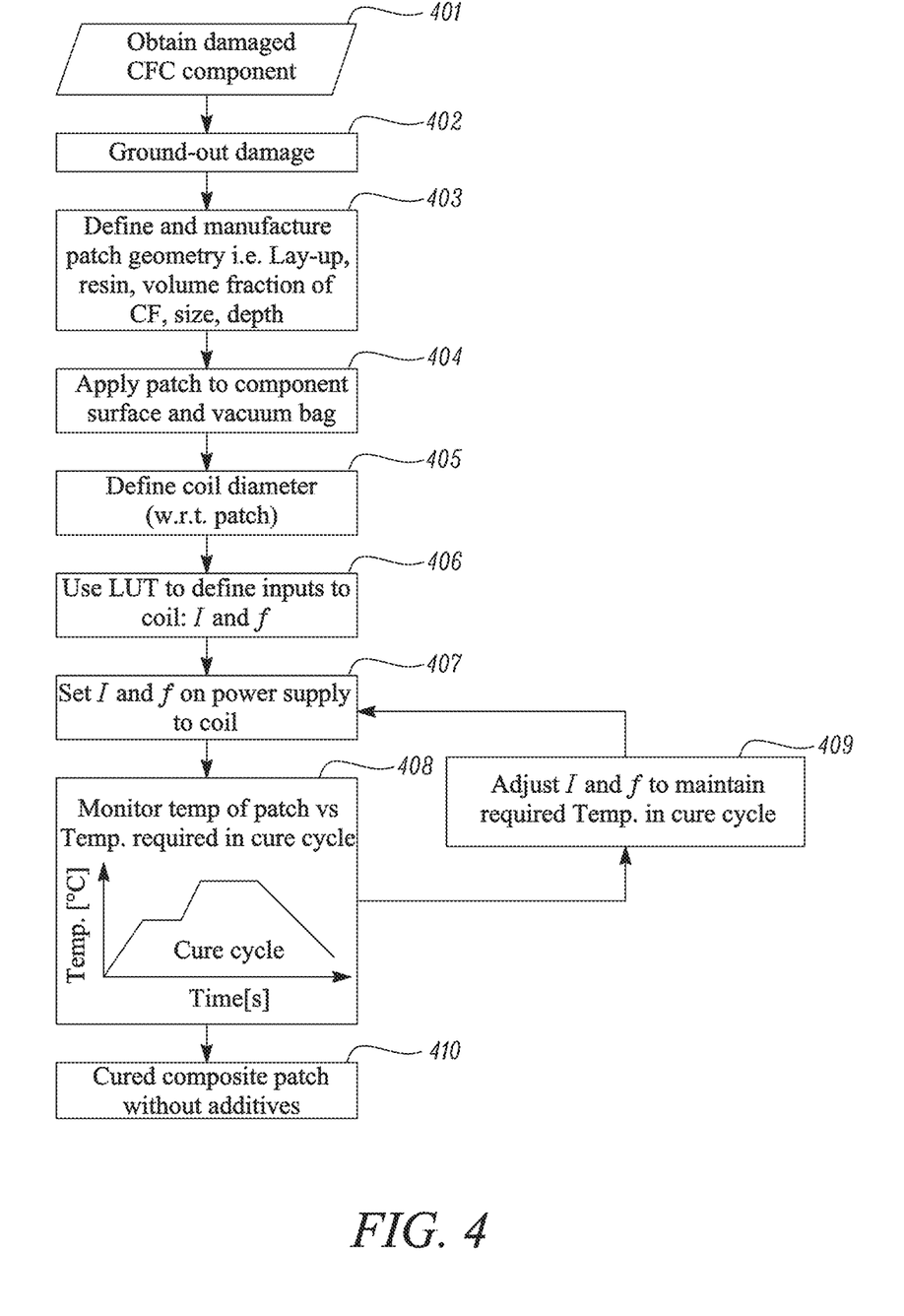
FIG. 4 shows a process flow for a composite repair procedure.

Firstly a damaged or defective region of a CFC component is obtained at step 401, and is prepared at step 402 by removing (e.g. by grinding out) the damaged or defective material, thereby forming a repair site. The geometry and material of a repair patch to re-build the component at the site can then be defined at step 403. In particular, the dimensions of the patch and its material properties, such as lay-up, resin, volume fraction of carbon fibre, can be defined. These material properties are preferably matched as closely as possible to those of the removed material. At step 404, the patch is applied at the repair site and a vacuum bag placed over the patch to apply pressure to the patch while it is cured.

The dimensions of the patch also determine at step 405 to a significant extent the size (i.e. diameter) of the, or each, alternating current coil used for induction heating the patch.

A desired maximum temperature of the patch and a desired penetration depth of the electromagnetic field to achieve an appropriate cure of the patch are then determined, which in turn allows the values for amp-turns (and hence current I) and frequency f to be determined which are then applied to the coil(s).

In the present embodiment, a pre-computed LUT appropriate for the dimensions of the patch and its material properties, and also appropriate for the size and stand-off of the coil(s), is used at step 406 to determine values for amp-turns (and hence current I) and frequency f which are then applied to the coil(s) based on the desired maximum temperature of the patch and the desired penetration depth of the electromagnetic field produced by the coil(s) in order to cure the resin matrix. The procedure to relate the desired maximum temperature of the patch and the desired penetration depth of the electromagnetic field to the values for amp-turns and frequency, which may be used to generate the LUT or may be performed on-line, will be described further with reference to FIG. 5.

The values of current I and frequency f are set at step 407 on the power supply to the coil(s), and the temperature of the patch is monitored at step 408 in order to ensure that it undergoes a suitable cure cycle. If necessary the coil current I can be adjusted at step 409 to maintain the cycle. Generally, the coil frequency f is kept fixed, however, in order to maintain an unchanged penetration depth.

The final result of the procedure obtained at step 410 is a repaired component in which the patch has been cured without use of any conductive additives.

In the above procedure, a pre-computed LUT is preferably used to determine the values for amp-turns NI and frequency f which are applied to the coil. The LUT can be constructed using a validated 3D multi-physics model-based approach. The 3D modelling captures the electrical and thermal properties of each layer of the CFC, e.g. assuming homogenous properties per layer for all the layers of the composite structure to be repaired. This modelling approach is shown schematically in FIG. 5.

Figure 5:
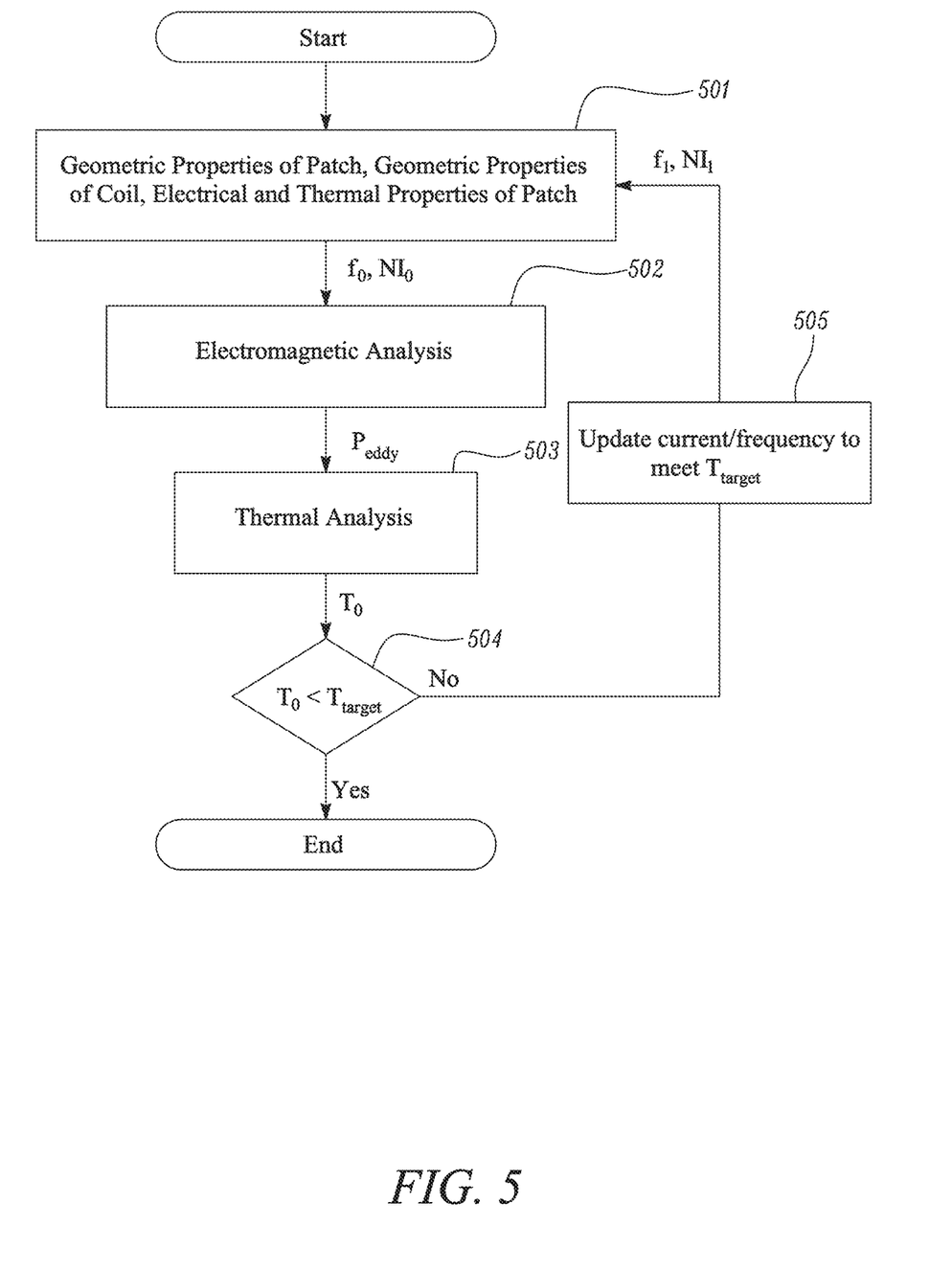
FIG. 5 shows a modelling approach for constructing a look-up table for determining values for amp-turns and frequency are applied to an AC coil in order to achieve a desired maximum temperature of a repair patch and a desired penetration depth of electromagnetic field.

More particularly, a first stage performed at step 501 is to define geometric properties of the patch and the, or each, coil. For the patch, these can include in particular its shape, dimensions, lay-up arrangement (i.e. position and number of layers and fibre direction), volume fraction of carbon fibres. For the coil these can include in particular its diameter, number of turns N, and stand-off from the patch. The geometric parameters of the patch also allow its electrical and thermal properties to be defined. Thus the electrical properties can include electrical conductivities in longitudinal and transverse directions of the fibres and through-thickness directions of the layers, and temperature coefficients of the electrical conductivities. The thermal properties can include thermal conductivities in longitudinal and transverse directions of the fibres and through-thickness directions of the layers, densities, heat capacities and heat transfer coefficients.

Next, at step 502, estimated values of the frequency $f_0$ and amp-turns $NI_0$ needed to achieve a desired maximum temperature $T_{target}$ in the patch and penetration depth are selected. An electromagnetic (EM) analysis based on a finite element model (FEM) of the patch and coil(s) is then used to determine an eddy current density distribution induced by the application of $f_0$ and $NI_0$ to the coil(s). Associated with this distribution is a determination of the penetration depth of the EM field in the patch. As well as the values for $f_0$ and $NI_0$, the EM analysis requires the defined geometric properties of the patch and the coil, and the electrical properties of the patch. The analysis can have suitable boundary conditions in order to contain the FEM to a finite size.

Figure 6:
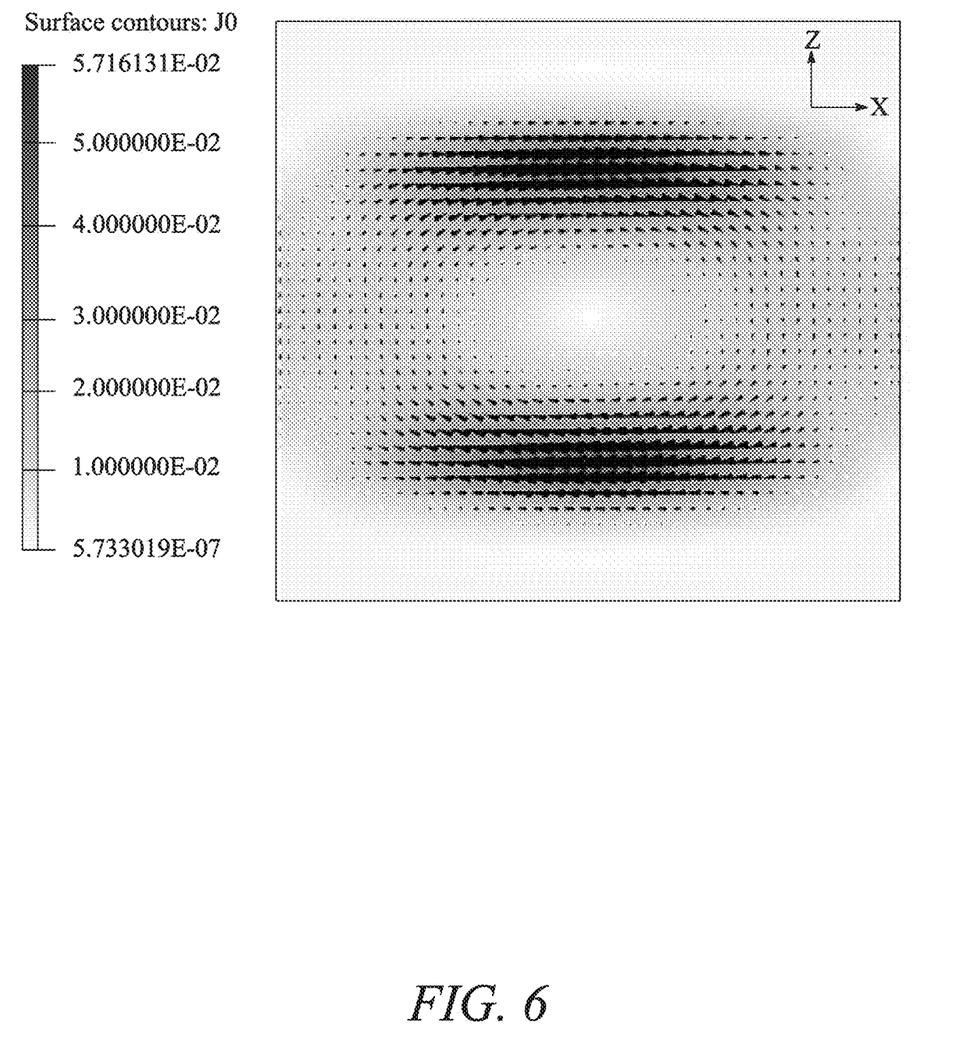
FIG. 6 shows surface contours of modelled current density distribution (amps per square millimetre) in a unidirectional Carbon Fibre reinforced polymer matrix Composite (CFC)

FIG. 6 shows predicted surface contours of eddy current density Jo induced by a circular coil from an example EM analysis. The current distribution is stretched along the x direction of the carbon fibres. This non-circular distribution is caused by the anisotropic electrical conductivity, which is highest in the carbon fibre direction. The low electrical resistance along the fibres means that the current flows closest to the applied magnetic field in the fibre direction. However, to complete a circuit, the current also has to cross high resistivity material in the though-thickness direction z. The current therefore spreads out to increase its cross-sectional area and thereby reduce the resistance, hence the overall oval shape of the eddy current distribution.

Referring again to FIG. 5, an FEM-based thermal analysis is then performed at step 503 to predict the maximum temperature of the patch. The thermal analysis requires the defined geometric and thermal properties of the patch. Thermal boundary conditions can be set using the defined heat transfer coefficients. Conveniently, the eddy current density Jo can be converted into a dissipated power distribution $P_{eddy}$ for inputting into the thermal analysis.

Figure 7:
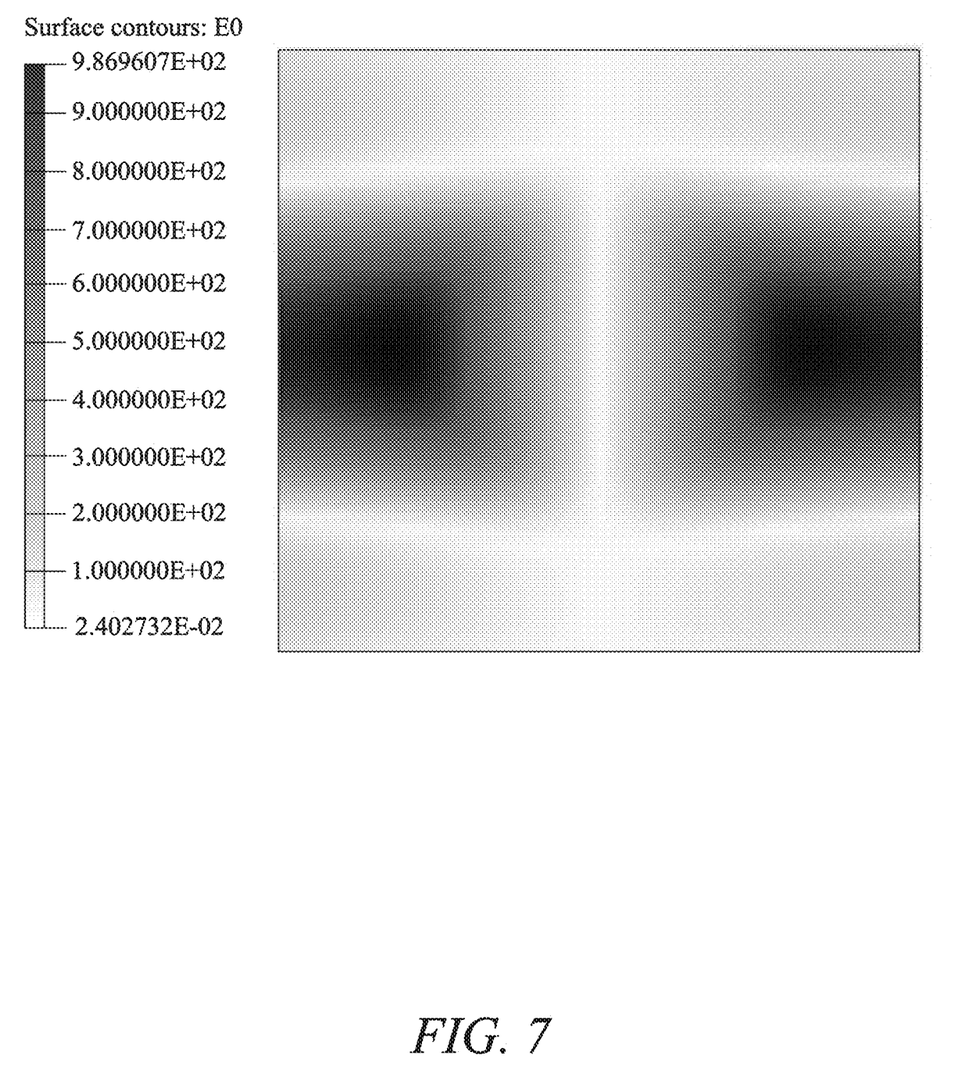
FIG. 7 shows surface contours of modelled electric field strength (volts per metre) in the CFC of FIG. 6.

More particularly, FIG. 7 shows the predicted surface contours of electric field strength $E_0$ for the EM analysis of FIG. 6, the electric field distribution being related directly to the eddy current density by the expression:

$$J = \sigma E \qquad \text{[Equation 4]}$$

The dissipated power distribution $P_{eddy}$ from Joule heating is determined by the expression:

$$P_{eddy} = \int E \cdot J\, dv = \int \frac{J^2}{\sigma}\, dv \qquad \text{[Equation 5]}$$

Figure 8:
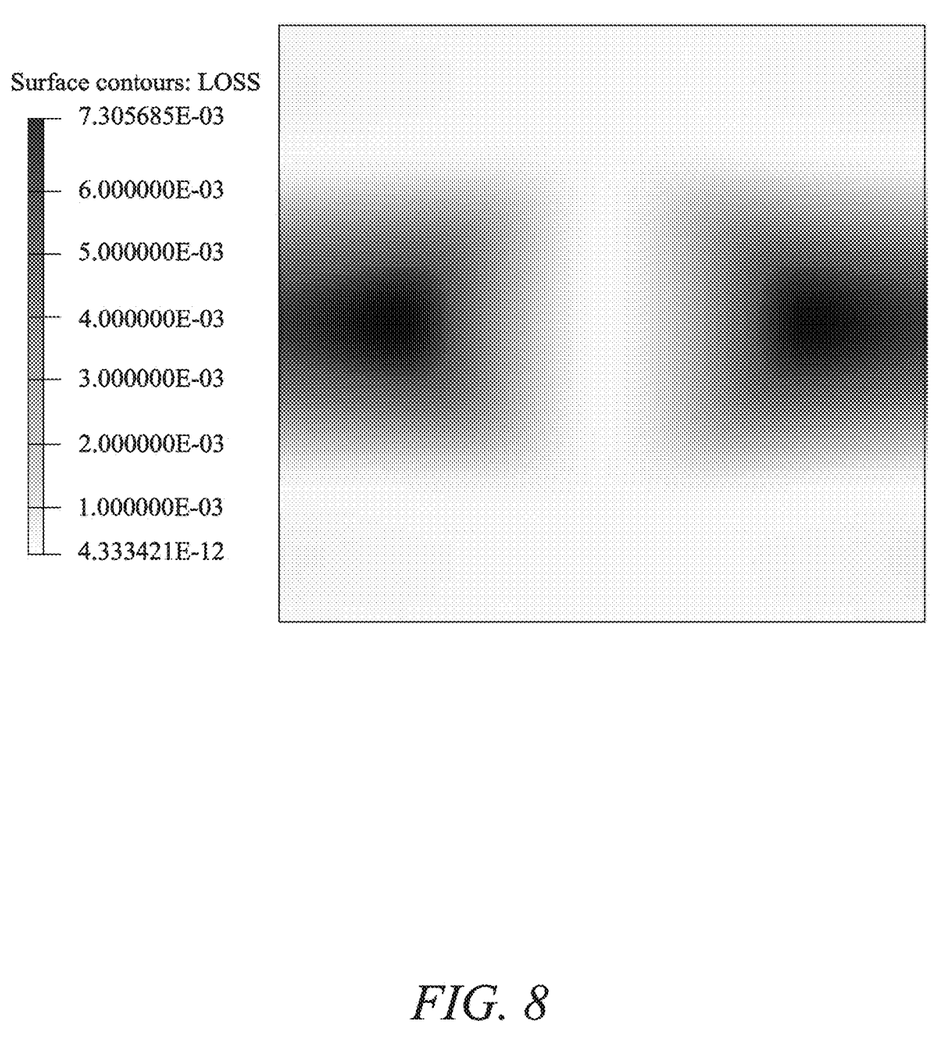
FIG. 8 shows surface contours of modelled dissipated power (watts) in the CFC of FIG. 6.

FIG. 8 shows the predicted surface contours of dissipated power distribution $P_{eddy}$ for the EM analysis of FIG. 6.

Figure 9:
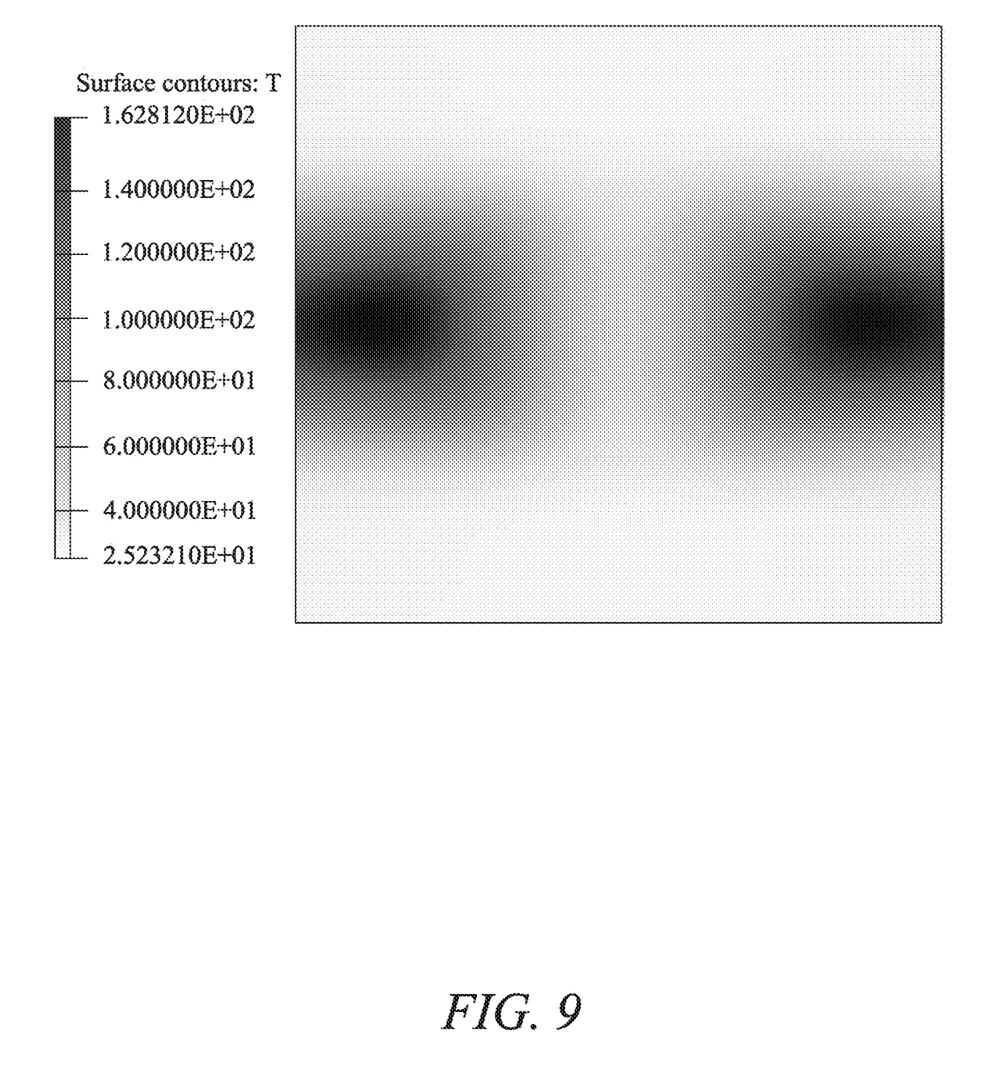
FIG. 9 shows surface contours of modelled temperature (degrees Celsius) in the CFC of FIG. 6.

FIG. 9 then shows the predicted surface contours of temperature from the thermal analysis using the dissipated power distribution $P_{eddy}$ of FIG. 8. The temperature distribution follows, as expected, a pattern to $P_{eddy}$ of FIG. 8. This illustrates the impact of the anisotropic thermal properties of the CFC. In particular, due to the large anisotropic changes in electrical and thermal conductivity, heat is mostly generated where the current density is lowest (FIG. 6) because of the low electrical conductivity to current flow orthogonal to the fibre direction.

Returning to FIG. 5, the modelling can include an automated return loop comprising steps 504 and 505 to update the values of $f_0$ and $NI_0$ if the maximum temperature $T_0$ predicted in the patch does not match the desired maximum temperature $T_{target}$.

Figure 10:
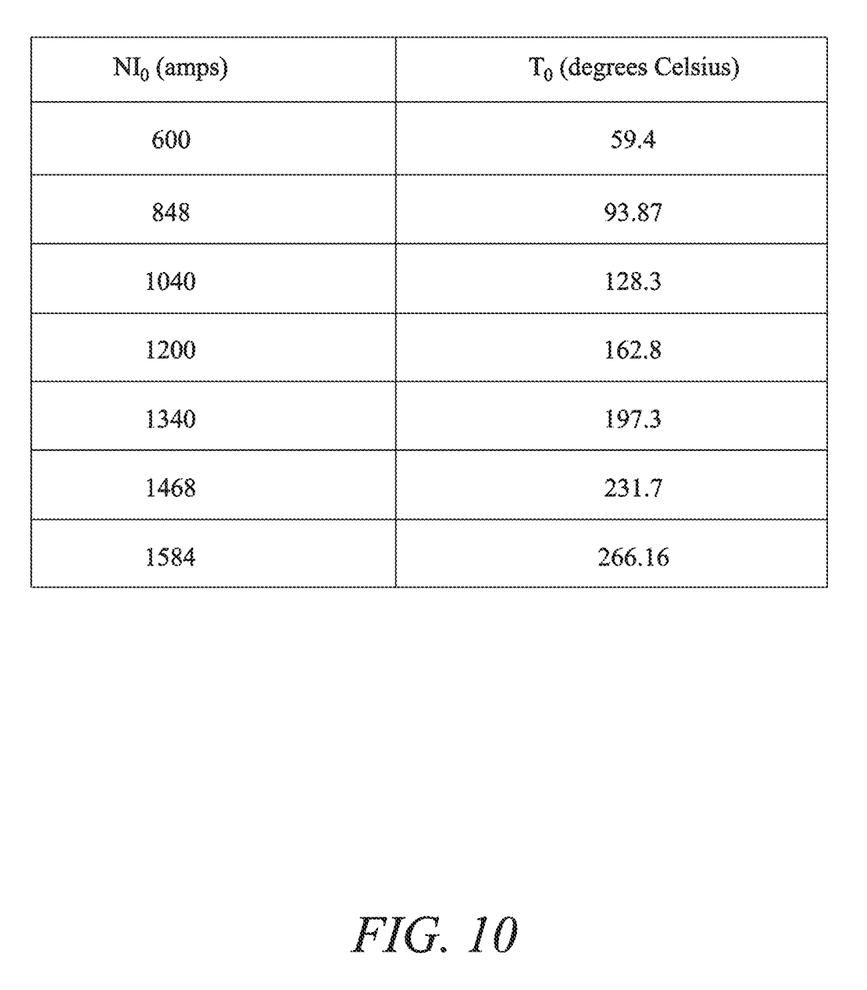
FIG. 10 shows part of a look-up table correlating value of amp-turns to maximum temperature for a coil frequency of 336 kilohertz.

By repeating the modelling of FIG. 5 for different pairs of values for $f_0$ and $NI_0$, an LUT can be constructed from the pairs of values for $f_0$ and $NI_0$ and the predicted penetration depth and predicted $T_0$ to which each pair is related. FIG. 10 shows an example of part of such an LUT, and correlates value of $NI_0$ to $T_0$ for an $f_0$ of 336 kilohertz.

When using the LUT in the repair procedure of FIG. 4, one option is to convert the table into the form of an empirical equation expressing amp-turns and frequency in terms of penetration depth and maximum temperature. Another option, however, is simply to interpolate amp-turns and frequency values as needed directly from the data of the table.

Overall, the LUT takes complex model parameters and simplifies them into a form where basic model inputs can be converted into the required current and frequency outputs to achieve a particular cure temperature for a given set of geometric properties of the patch and coil. Typically a given repair shop will repair composites over a restricted range of geometries, and thus will require access to only a limited number of LUTs to cover their range of activities.

It will be appreciated, however, by those skilled in the art that as an alternative to producing an LUT, the determination of the values of amp-turns and frequency on the basis of determining a desired maximum temperature of the patch and a desired penetration depth of the electromagnetic field may be performed at the stage of curing the patch.

As well as advantages already mentioned above, the repair procedure:

is efficient compared to conventional repair techniques such as thermal blanket and autoclave approaches;
improves heat distribution in through-thickness repairs;
provides a temperature feedback loop for control;
is applicable to existing, certified CFC materials; and
focuses heat on a local area, eliminating or reducing damage to parent structures.

In aerospace applications, the procedure may be used to repair e.g. composite integrated accessory rafts, fan cases, fan blades and airframe components. However, the procedure may use in other sectors such as marine (e.g. propeller blades, deck machinery, azimuthing thrusters, etc.) and automotive (e.g. motorsport, lightweight roadgoing vehicles, etc.).

Embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

While the disclosure has been described in conjunction with the exemplary embodiments described above, many equivalent modifications and variations will be apparent to those skilled in the art when given this disclosure. Accordingly, the exemplary embodiments of the disclosure set forth above are considered to be illustrative and not limiting. Moreover, in determining extent of protection, due account shall be taken of any element which is equivalent to an element specified in the claims. Various changes to the described embodiments may be made without departing from the spirit and scope of the disclosure.

All references mentioned herein are hereby incorporated by reference.

The invention claimed is:

1. A procedure for repairing a polymer matrix composite component, the procedure comprising:
    providing a polymer matrix composite component having a site prepared for repair by removal of damaged or defective material;
    locating an uncured, polymer matrix composite repair patch at the site to re-build the component thereat; and
    curing the polymer matrix of the repair patch by heating the patch using eddy currents induced by one or more alternating current coils, including a process of determining a desired maximum temperature of the patch and a desired penetration depth of the electromagnetic field produced by the one or more alternating current coils, and using said desired maximum temperature and said desired penetration depth to determine corresponding values of amp-turns and frequency which are then applied to the, or each, coil in the curing process;
    wherein the repair patch is without metallic additives, such that the repaired polymer matrix composite after the curing step is also without metallic additives in the vicinity of the repair patch.

2. A procedure for repairing a polymer matrix composite component according to claim 1, wherein the composite of the repair patch has sufficient intrinsic electrical conductivity without such additives to allow all the eddy currents used to heat the patch to flow only through the composite.

3. A procedure for repairing a polymer matrix composite component according to claim 1, wherein pressure is applied to the repair patch during the curing.

4. A procedure for repairing a polymer matrix composite component according to claim 1, wherein the polymer matrix composite of the repair patch is the same material as the polymer matrix composite of the component.

5. A procedure for repairing a polymer matrix composite component according to claim 1, wherein the polymer matrix composite of the repair patch is a carbon fibre reinforced polymer matrix composite.

6. A procedure for repairing a polymer matrix composite component according to claim 1, further comprising monitoring the patch temperature during the induction heating and adjusting amp-turns applied to the, or each, coil to attain a desired maximum temperature of the patch.

7. A procedure for repairing a polymer matrix composite component according to claim 1, including a preliminary step of removing the damaged or defective material from the component to prepare the site.

8. A procedure for repairing a polymer matrix composite component according to claim 1, in which a look-up table is used to relate the desired maximum temperature and said desired penetration depth to corresponding values of amp-turns and frequency.

9. A procedure for repairing a polymer matrix composite component according to claim 8, in which the desired maximum temperature and said desired penetration depth are related to corresponding values of amp-turns and frequency by:
   (i) providing geometric properties of the patch, geometric properties of the coil, electrical properties of the patch, and thermal properties of the patch;
   (ii) determining a desired maximum temperature of the patch and a desired penetration depth of the electromagnetic field of the alternating current coil;
   (iii) estimating values for the amp-turns and frequency of the alternating current to be applied to a coil:
   (iv) using the provided geometric properties of the patch and the coil, the provided electrical properties, and the estimated values for the amp-turns and frequency to predict an eddy current density distribution in the patch and a corresponding penetration depth of the electromagnetic field produced by the coil,
   (v) using the predicted eddy current density distribution, the provided geometric properties of the patch, and the provided thermal properties of the patch to predict the maximum temperature of the patch, and
   (vi) repeating steps (iii) to (v) for different estimated values for the amp-turns and frequency of the alternating current until the predicted penetration depth and the predicted maximum temperature converge on the desired maximum temperature of the patch and a desired penetration depth of the electromagnetic field.

10. A method of determining values for amp-turns and frequency of an alternating current to be applied to an alternating current coil used for induction heating of a polymer matrix composite repair patch, the method comprising:
   (i) providing geometric properties of the patch, geometric properties of the coil, electrical properties of the patch, and thermal properties of the patch;
   (ii) determining a desired maximum temperature of the patch and a desired penetration depth of the electromagnetic field of the alternating current coil;
   (iii) estimating values for the amp-turns and frequency of the alternating current to be applied to a coil:
   (iv) using the provided geometric properties of the patch and the coil, the provided electrical properties, and the estimated values for the amp-turns and frequency to predict an eddy current density distribution in the patch and a corresponding penetration depth of the electromagnetic field produced by the coil,
   (v) using the predicted eddy current density distribution, the provided geometric properties of the patch, and the provided thermal properties of the patch to predict the maximum temperature of the patch, and
   (vi) repeating steps (iii) to (v) for different estimated values for the amp-turns and frequency of the alternating current until the predicted penetration depth and the predicted maximum temperature converge on the desired maximum temperature of the patch and a desired penetration depth of the electromagnetic field.

11. A method according to claim 10, in which the estimated values for the amp-turns and frequency of the alternating current whose predicted penetration depth and the predicted maximum temperature match the desired maximum temperature of the patch and a desired penetration depth of the electromagnetic field are stored in a look-up table as a key-value pair.

12. A method according to claim 10, in which steps (i) to (vi) are repeated for one or more of:
   different geometric properties of the patch;
   different geometric properties of the coil;
   different electrical properties of the patch;
   different thermal properties of the patch.

13. A non-transitory computer-readable medium encoded with one or more look-up tables constructed by the method of claim 11.

* * * * *